(12) United States Patent
Lutsch et al.

(10) Patent No.: US 7,048,562 B2
(45) Date of Patent: May 23, 2006

(54) CONNECTION BETWEEN A CABLE END PIECE AND A CABLE END

(75) Inventors: Harald Michael Lutsch, Weiterstadt (DE); Ranko Resman, Zagreb (HR); Vladimir Buden, Zagreb (HR); Minja Adzic, Zagreb (HR)

(73) Assignee: Yazaki Europe Ltd., Hertfordshire (GB)

( * ) Notice: Subject to any disclaimer, the term of this patent is extended or adjusted under 35 U.S.C. 154(b) by 0 days.

(21) Appl. No.: 10/986,837

(22) Filed: Nov. 15, 2004

(65) Prior Publication Data

US 2006/0014412 A1    Jan. 19, 2006

(30) Foreign Application Priority Data

Jul. 13, 2004    (DE)    ................ 10 2004 034 038
Nov. 12, 2004    (JP)    ................ 2004-329536

(51) Int. Cl.
    *H01R 13/52*    (2006.01)
(52) U.S. Cl. ........................ 439/275; 439/874
(58) Field of Classification Search ............. 439/868, 439/887, 874
    See application file for complete search history.

(56) References Cited

U.S. PATENT DOCUMENTS

| | | | |
|---|---|---|---|
| 2,385,792 A | | 10/1945 | Carlson |
| 2,740,102 A | | 3/1956 | Paules |
| 2,806,215 A | * | 9/1957 | Redslob ..................... 439/868 |
| 3,098,688 A | * | 7/1963 | Crimmins et al. .......... 439/730 |
| 3,123,663 A | | 3/1964 | Muldoon |
| 3,345,692 A | | 10/1967 | Cobaugh et al. |
| 3,955,044 A | * | 5/1976 | Hoffman et al. ........... 174/84 C |
| 4,391,483 A | * | 7/1983 | Desourteaux ............... 439/275 |
| 5,364,285 A | | 11/1994 | Sakurai |
| 5,418,331 A | * | 5/1995 | Delalle ........................ 439/874 |
| 5,514,836 A | * | 5/1996 | Delalle et al. .............. 174/87 |
| 6,069,320 A | * | 5/2000 | Rocci et al. ................ 174/84 R |

(Continued)

FOREIGN PATENT DOCUMENTS

DE         29 25 852         1/1981

(Continued)

OTHER PUBLICATIONS

Patent Abstracts of Japan, Publication No. 2000285983 A; publication Oct. 13, 2000; Sumitomo Wiring Syst. Ltd.

*Primary Examiner*—Briggitte R. Hammond
(74) *Attorney, Agent, or Firm*—Sughrue Mion, PLLC (57) ABSTRACT

An electrically conductive connection between a cable end piece (5) and a cable end (1), having a conductor portion (2) and an insulation portion (3) with an outer face (4), comprising a cable end piece (5), which is made from an electrically conductive metal, has a connection end (6), has tabs (9) for connecting, a separate sleeve (10), which is made from an electrically conductive metal, encloses the cable end (1) along a predetermined length, is connected to the cable end piece (5), has a first end (11), which is arranged close to the connection end (6), and a second end (12), which is arranged distanced to the connection end (6), is closed at its first end (11) in a sealed manner, forms in a portion towards the second end between itself and the outer face (4) of the insulation portion (3) an annular accommodation chamber (14), a sealing grommet (16), which is at least partially arranged in the accommodation chamber (14) and seals between the sleeve (10) and the outer face (4) of the insulation portion (3) of the cable end (1).

13 Claims, 13 Drawing Sheets

U.S. PATENT DOCUMENTS

| | | | |
|---|---|---|---|
| 6,341,979 B1 * | 1/2002 | Yamamoto | 439/415 |
| 6,538,203 B1 * | 3/2003 | Nolle et al. | 174/84 R |
| 6,666,732 B1 * | 12/2003 | Endacott | 439/874 |
| 2002/0096352 A1 | 7/2002 | Kuwayama et al. | |

FOREIGN PATENT DOCUMENTS

| | | |
|---|---|---|
| DE | 298 06 778 U1 | 10/1999 |
| DE | 102 02 102 A1 | 11/2002 |
| EP | 0 951 098 A2 | 4/1999 |
| FR | 2 475 304 | 8/1981 |
| FR | 2 629 645 | 3/1989 |
| GB | 755272 | 8/1956 |
| GB | 790744 | 2/1958 |
| GB | 1 443 578 | 7/1976 |
| GB | 2052891 A | 1/1981 |

* cited by examiner

CONNECTION BETWEEN A CABLE END PIECE AND A CABLE END

BACKGROUND OF THE INVENTION

The invention relates to an electrically conductive connection between a cable end piece and a cable end, having a conductor portion and an insulation portion with an outer face. The cable end piece consists of an electrically conductive metal and has a connection end, for example in form of an eyelet.

Such an embodiment is, for example, known from the Patent Abstract of Japan No. 2000285983. The conductor portion and the insulation portion are crimped to the cable end piece by means of tabs. The connection between the cable end piece and the cable end is additionally sealed by means of a shrink-on plastic tube.

In wirings in the engine compartment of an automotive vehicle, because of the temperatures achieved there, at the insulations of the cables made from plastic or seals made from plastics, enlargements are produced, which allow a transport of moisture within a cable, so that moisture can reach, starting from the entry position at a cable end, up to the connectors and therefore, to the electrically conductive connections at the other end, so that malfunctions can be produced.

Therefore, it is object of the present invention to construct an electrically conductive connection between a cable end piece and a cable end, comprising a conductor portion and an insulation portion, so tight, that no moisture can enter into the area between the conductor portion and the insulation portion.

SUMMARY OF THE INVENTION

This object is solved according to the invention by an electrically conductive connection between a cable end piece and a cable end, having a conductor portion and an insulation portion with an outer face, comprising: a cable end piece, which is made from an electrically conductive metal, has a connection end, has tabs for connecting, a separate sleeve, which is made from an electrically conductive metal, encloses the cable end along a predetermined length, is connected to the cable end piece, has a first end, which is arranged close to the connection end, and a second end, which is arranged distanced to the connection end, is closed at its first end in a sealed manner, forms in a portion towards the second end between itself and the outer face of the insulation portion an annular accommodation chamber, a sealing grommet, which is at least partially arranged in the accommodation chamber and seals between the sleeve and the outer face of the insulation portion of the cable end.

Of advantage in this embodiment is, that the sleeve made from metal enables a hermetical seal, in so far as it is hermetically closed at its first end and has at its second end a sealing grommet, which extends at least over an essential partial portion of the length within the sleeve and which seals towards the outer face of the insulation portion of the cable end. The sealing grommet is arranged in a protected manner with an at least essential part of its length within the sleeve made from metal. By means of the undetachable connection between the sleeve made from metal and the cable end piece also made from metal, a very good electric conductivity to the conductor portion of the cable end is achieved besides the sealing. The connection end of the cable end piece can, preferably, be formed as an eyelet or a yoke, respectively.

A first embodiment of the sleeve provides, that the sleeve comprises a first sleeve portion, having a first bore portion, adapted concerning the diameter to the conductor portion, and a second sleeve portion, which forms by a second bore portion the accommodation chamber.

An advantageous connection between the sleeve and the cable end piece is achieved such, that the first sleeve portion, accommodating the conductor portion, is connected via the tabs to the cable end piece. An advantageous embodiment is further achieved such, that the sleeve is made closed at its first end. The sleeve is only open at its second end. Through this portion the cable end enters into the sleeve, wherein then via the sealing grommet a hermetical seal between the sleeve and the outer face of the insulation portion of the cable end is achieved.

In a first embodiment it is provided, that the conductor portion is directly crimped by means of the tabs to the cable end portion. Hereby, the sleeve is moved beyond the tabs in the direction towards the connection end and projects beyond the tabs and is deformed in a sealed manner abutting the transition portion between the tabs and the connection end of the cable end piece. The connection of the sleeve and the tabs to the conductor portion of the cable end is achieved by crimping the covering portion between the sleeve and the tabs. Preferably, the hermetical seal at the first end of the sleeve is achieved such, that the portion of the sleeve abutting the transition portion is welded undetachably to the transition portion and thus forms a sealed closure at the first end towards the cable end piece.

An especially advantageous design is especially achieved with a stepped sleeve closed at its first end, wherein a flattened portion, which is undetachably connected by means of welding to the cable end piece, follows the closed first end of the sleeve. The sleeve is preferably formed for this purpose with steps before connecting. The sleeve is otherwise only connected via the tabs to the cable end piece in such a way, that no crimping connection achieving a connection to the conductor portion is achieved. An electrically conductive connection is achieved between the conductor portion and the first sleeve portion by crimping of the first sleeve portion to the conductor portion. This construction makes it possible, that the sleeve and the cable end piece can be already connected to each other before connecting to the cable end. Preferably, the first sleeve portion and the second sleeve portion are formed differently concerning the diameter of the outer face. A different advantageous embodiment of the invention provides, that the sleeve is crimped by means of the tabs of the cable end piece to the conductor portion accommodated in the sleeve.

Also advantageous is, when the sleeve and the cable end piece are made from the same metal, for example a copper material. The cable end piece can have an eyelet portion or yoke portion for connecting, respectively.

The invention relates further to a sealing grommet, which can be used generally with a cable end, which is passed through a bore of a member, to achieve a seal between the cable end and the bore of the member. It is, however, especially advantageous in relation to a connection between a cable end piece and a cable end according to the invention. The sealing grommet according to the invention solves, especially, the object, to prevent, that it can again exit after having been pressed into an insertion bore or the accommodation chamber of the sleeve according to the invention, i.e. it can be detached therefrom. This happens, for example, because of the conditions of operation or because of the restoration forces generated during press-mounting of the sealing grommet.

The sealing grommet serves, especially, to achieve a tight and secure connection to an insertion bore or to an accommodation chamber of the sleeve according to the invention.

This object is solved according to the invention by a sealing grommet, made from a soft elastic material, for an electric cable portion, having a conductor portion and an insulation portion enclosing the same and having a predetermined outer diameter, serving to seal the cable portion relative to a member having an insertion bore, into which the cable portion is insertable, comprising a tubular portion which extends along a longitudinal axis between a first end and a second end, having an outer face, which is provided with annular first sealing beads, distributed along the longitudinal axis and extending around the outer face, having a through extending bore, which is provided with second sealing beads, distributed along the longitudinal axis and extending annularly and projecting towards the longitudinal axis, which is provided towards the first end with means, which form an abutment with a circular passage therein, which is dimensioned concerning its diameter smaller than the outer diameter of the insulation portion of the cable portion.

By means of the abutment the sealing grommet is retained at the end of the cable portion (in the following named shortly "cable end"). It is supported on the end face of the insulation portion of the cable end. The conductor portion passes through the abutment and is, for example, directly connected to a cable end piece. It can, how-ever, also advantageously be connected in the form to that cable end piece, as it is described above in connection with this invention.

In an embodiment of the invention it is provided, that the abutment is formed by a circumferentially extending collar formed integrally and projecting in the bore towards the longitudinal axis. This is always then sufficient, when the collar has a sufficient large stiffness, or the forces, which allow the sealing grommet to exit, are smaller. Preferably it is, however, provided, that the abutment is formed by a ring embedded partially in the tubular portion and projecting in the bore towards the longitudinal axis and formed from a material, which has a greater hardness compared to the material, from which the tubular portion is manufactured.

A further possibility is, that the abutment is formed such, that the tubular portion is provided towards the first end with a reinforcement ring which reduces partially the tubular portion in diameter.

For the case, that a ring is also embedded, it is provided, that the same is formed as a flat disc, which for example is made from a hard plastic material, especially PBT or PA or a metal.

For the case of attachment of a reinforcement ring, it is provided, that the same has the form of a flat ring or a wire ring. For this, it can be made from a plastic or a metal.

To be able to limit the pressing of the sealing grommet, it is provided, that on the second end of the tubular portion an annular collar is formed integrally, which projects to the outside away from the longitudinal axis. The insertion of the tubular portion can be facilitated, when at its first end a conical insertion face is provided.

Advantageous is the application of the above described sealing grommet in a connection according to this invention, wherein it forms the thus provided sealing grommet. In this case the accommodation chamber of the sleeve forms the insertion bore for the sealing grommet.

DETAILED DESCRIPTION OF THE INVENTION

Figure 1:
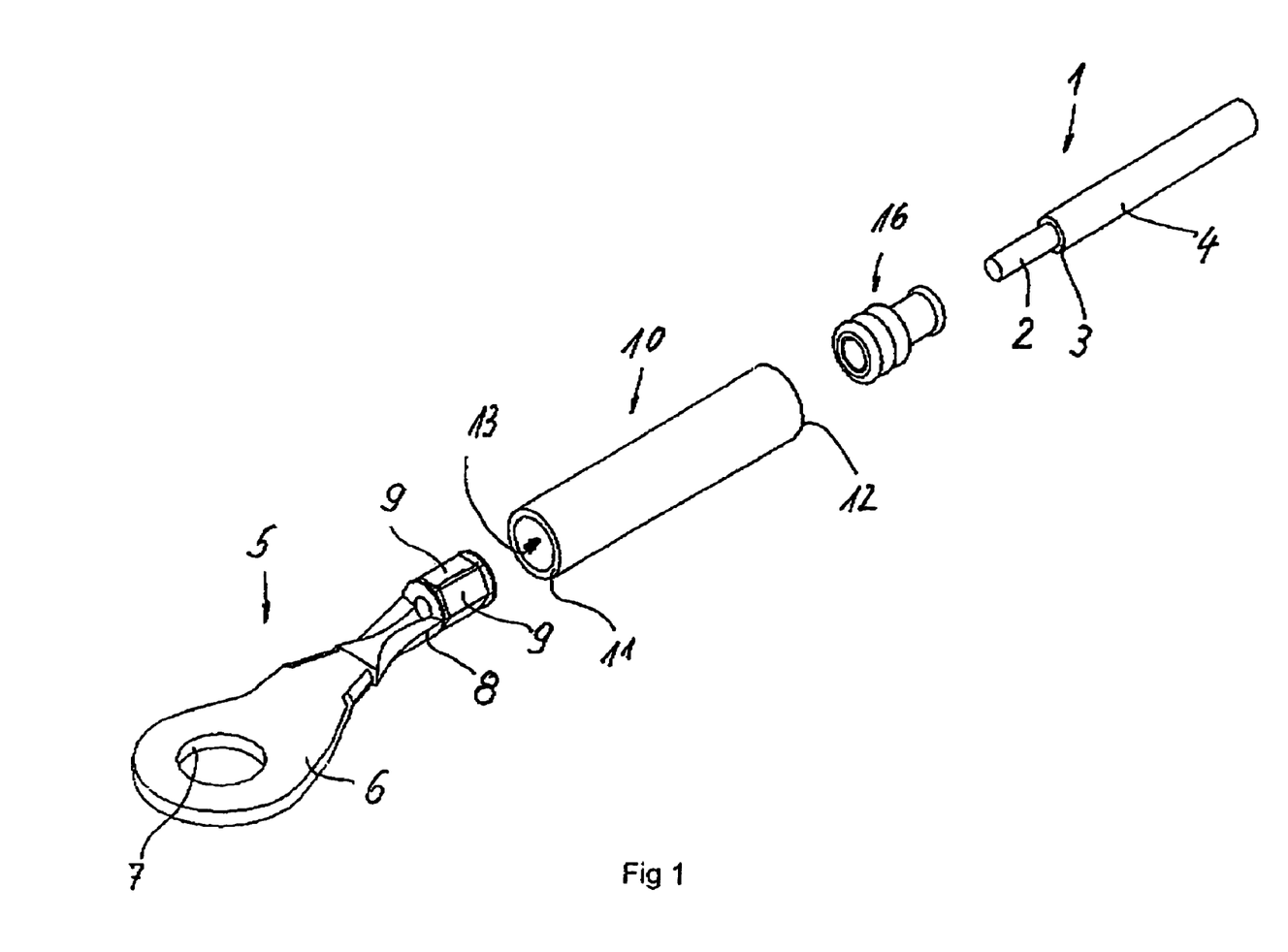
FIG. 1 an exploded representation of the components belonging to a first embodiment of an electrically conductive connection according to the invention between a cable end piece and a cable end, i.e. before connecting the same, FIG. 2 the components visible in FIG. 1 in the assembled condition, in a longitudinal sectional view, FIG. 3 the connection in the final condition in a perspective representation, FIG. 4 a second embodiment of an electrically conductive connection according to the invention, wherein a stepped sleeve is used and the components belonging to the connection are shown in an exploded view be-fore the assembly, FIG. 5 the embodiment of FIG. 4 in the assembled condition of the components, wherein, however, a perspective representation in a sectional view is selected, FIG. 6 a perspective representation of the connection in the final condition, FIG. 7 an exploded representation of the components, belonging to a third embodiment of an electrically conductive connection according to the invention between a cable end piece and a cable end, before connecting the same, FIG. 8 the components visible in FIG. 7 in the connected condition, in a longitudinal sectional view, and FIG. 9 the connection in the final condition in a perspective representation, FIG. 10 a sectional view through the sealing grommet according to the invention as well as through a component, in which the same is to be mounted and a cable end, from which end the insulation portion is removed, so that the conductor is exposed, and before the components are connected, FIG. 11 the components visible in FIG. 1 in the mounted condition, FIG. 12 a perspective sectional view of an embodiment of a sealing grommet changed compared to that of FIGS. 10 and 11, and FIG. 13 a perspective sectional view of a further embodiment of a sealing grommet.
Figure 2:
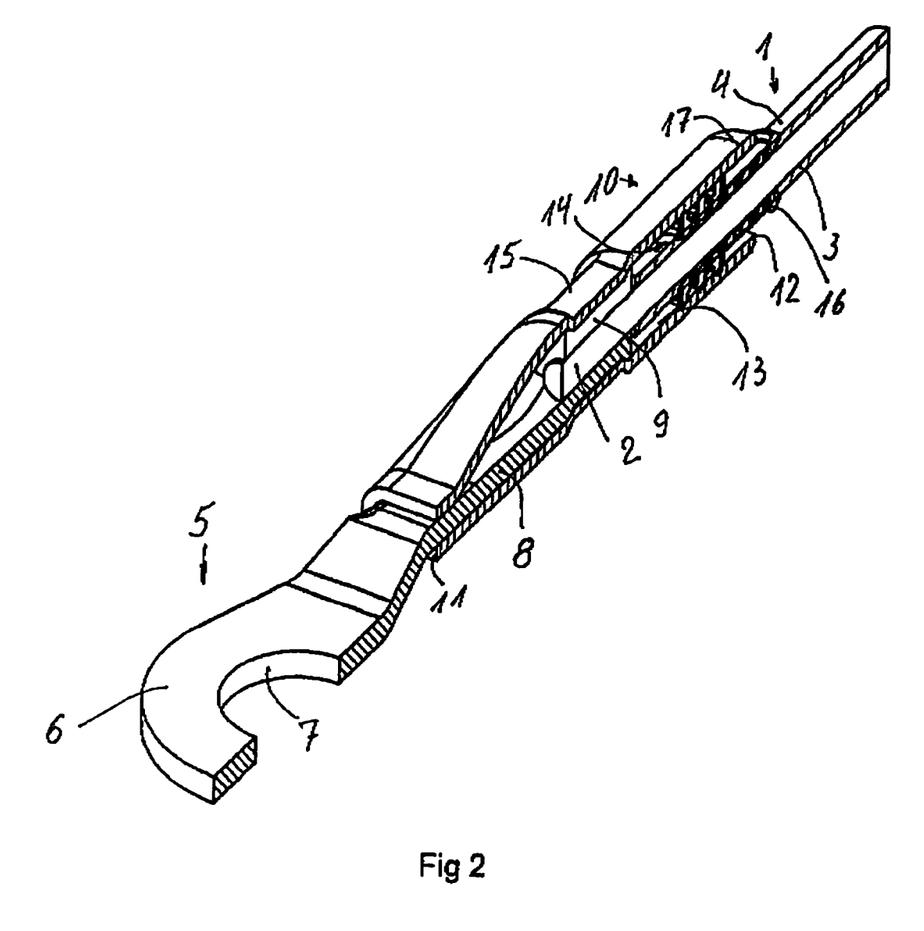
Figure 3:
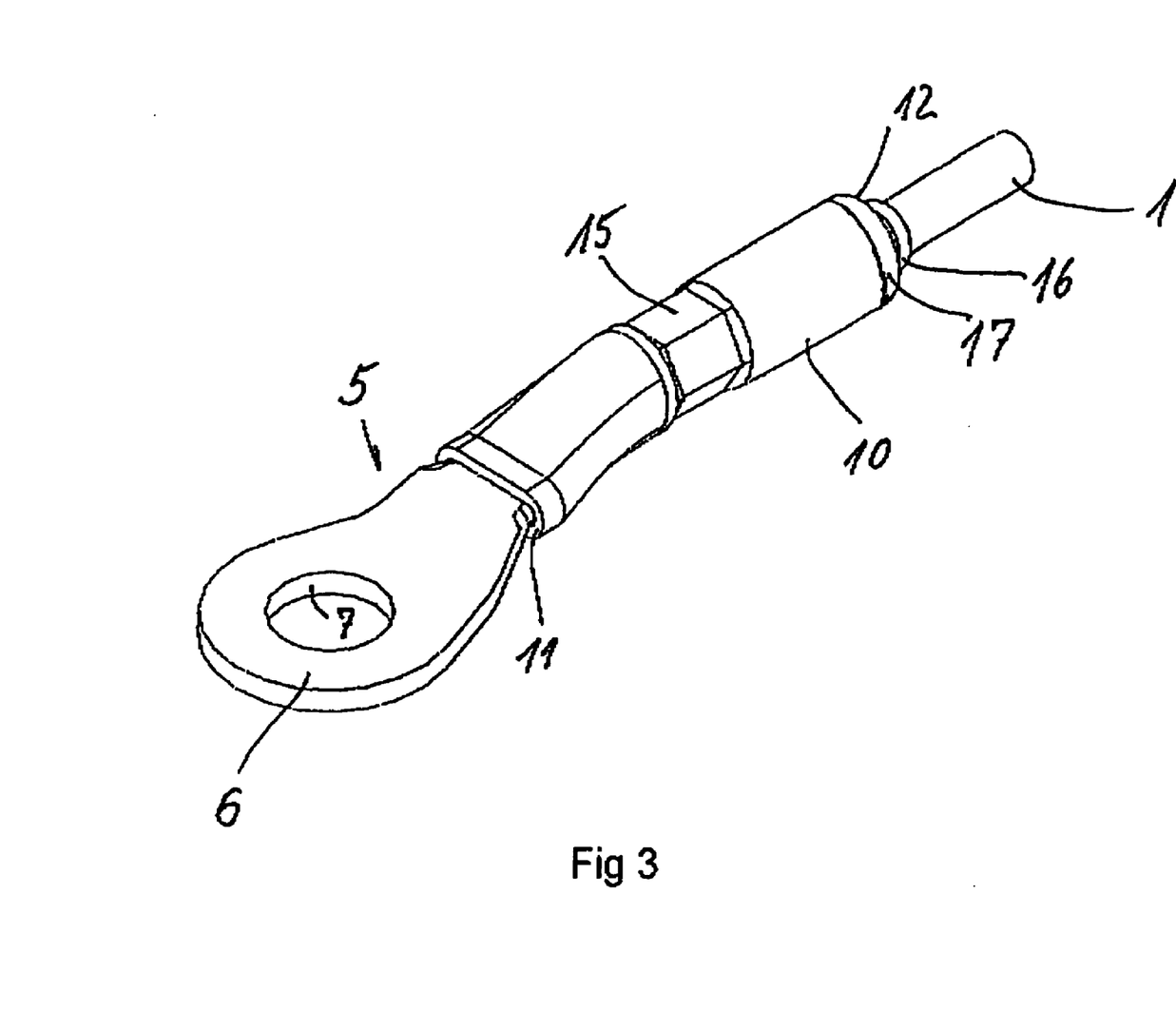

Firstly, a description of the connection according to the first embodiment is made by means of FIGS. 1 to 3. In FIG. 1 the cable end 1 with the exposed conductor portion 2 and the insulation portion 3 with the outer face 4 is visible in the disconnected condition. The conductor portion 2 may, for example, consist of a plurality of conducting wires.

Furthermore, the cable end piece 5 is visible, having a connection end 6 in form of an eyelet. The connection end 6 has, thus, a through bore 7. The connection end 6 is followed by the connection end 8, which is provided with tabs 9, which are already pre-bent, so that an essentially hollow-cylindrical portion is produced, which forms an entry bore for the conductor portion 2 of the cable end 1. The connection end 6 is formed preferably slightly cranked towards the connection end 8 with the tabs 9.

Furthermore, a sleeve 10 is visible, which is pushed over the tabs 9 and thus the connection portion 8. The sleeve 10 consists also as the cable end piece 5 of a metal. Both consist, preferably, of the same material, wherein, preferably, a copper material is used.

The connection end 6 serves, preferably, for fixing on a device or an equipment element of an automotive vehicle, for example, in the engine compartment of the same.

The sleeve 10 has a first end 11 and a second end 12 as well as a through bore 13. Finally, the sealing grommet 16 is visible as well, which, for example, is made from a rubber material or a plastic material, and has sealing beads as well as a through bore. The cable end 1 extends through this sealing grommet 16, wherein the sealing grommet 16 comes to rest in the bore 13 towards the second end 12 of the sleeve 10 in a sealed manner and rests in a sealed manner on the outer face 4 of the insulation portion 3 of the cable end 1.

As visible from FIG. 2, in the assembled condition, the cable end 1 is received in the sleeve 10 such, that the conductor portion 2 rests in the bore portion of the cable end piece 5 formed by the tabs 9. The sleeve 10 is pushed on so far, that it covers the tabs 9 and a further part of the connection end 8 in the direction towards the connection end 6 of the cable end piece 5. Between the wall of the bore 13 of the sleeve 10 and the outer face 4 of the insulation portion 3 of the cable end 1 an accommodation chamber 14 is formed, in which the sealing grommet 16 is received at least with a portion of its axial length. The sleeve 10 covers a predetermined length of the cable end 1, especially, however, with a length, which ensures, that the sealing grommet 16 sitting on the insulation portion 3, is securely accommodated in the sleeve 10 and held there. In FIGS. 2 and 3 it is visible, that a smaller length portion of the sealing grommet 16 projects radially to the rear beyond the second end 12 of the sleeve 10. Towards the first end 11 the sleeve 10 is flattened, so that it abuts closely the connection end 8 or the transition portion between the same and the connection end 6, respectively. Additionally, both parts are welded to each other, especially by means of resistance welding. The electrically conductive connection between the cable end piece 5 and the conductor portion 2 is produced such, that the sleeve 10 as well as the tabs 9 in the area of their cover, i.e. in the crimping portion 15 are crimped to each other and to the conductor portion 2.

Additionally towards the second end 12 a holding portion 17 is provided, which is achieved by radial deformation, i.e. cross-section reduction of the portion towards the second end 12, so that it is ensured, that the sealing grommet 16 is securely held in the sleeve 10 and the corresponding compression for achieving a sealed connection is achieved.

The invention provides also a hermetical closure of the sleeve 10 at its first end 11 by means of crimping and welding to the cable end piece 5 and at the other end a her-metical seal towards the insulation portion 3 of the cable end 1 by means of the sealing grommet 16. In this case, the sealing grommet 16 is accommodated in the sleeve 10 in a protected manner. The covering between the sleeve 10 and the insulation portion 3 as well as the length of the sealing grommet 16 can be selected such, that also with temperature effects onto the insulation portion 3 no non-sealed portion in the area of the second end 12 is produced, which would enable an entering of moisture.

Only one cable end 1 of a cable is shown. The other end of the cable, to which the cable end 1 belongs, can be provided with a similar connection or can belong, for example, to a connector, which is connected to a device within an automotive vehicle. For automotive vehicles it is important, that especially with the remarkable number of electronic equipment no malfunction is produced. This is especially so for control devices relevant for the safety of the handling and the operation of the vehicle.

Figure 4:
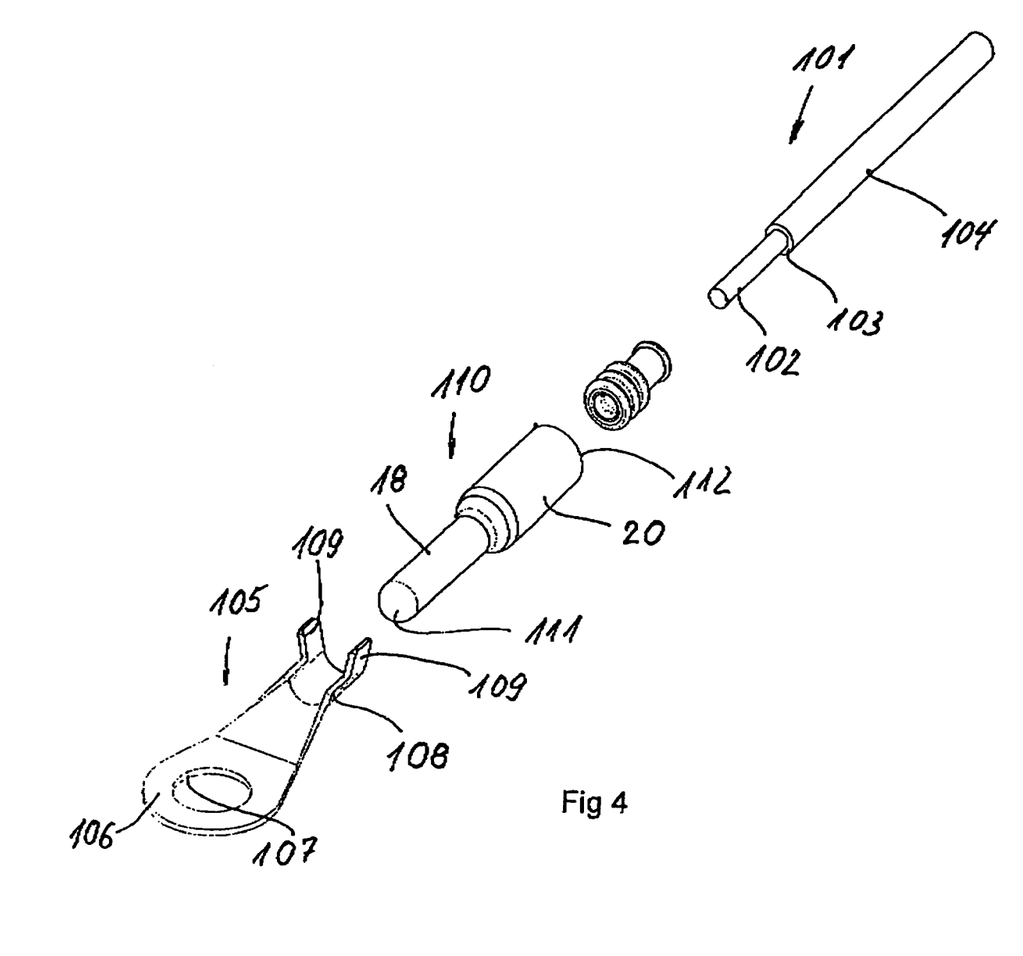
Figure 5:
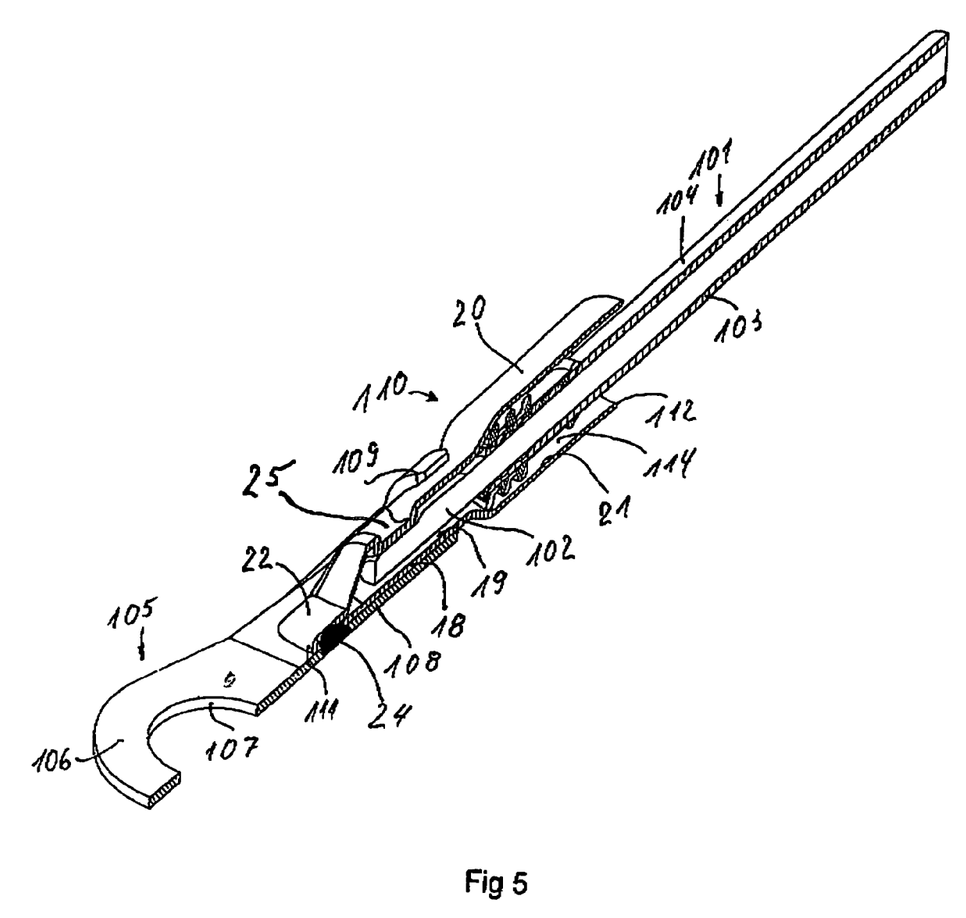
Figure 6:
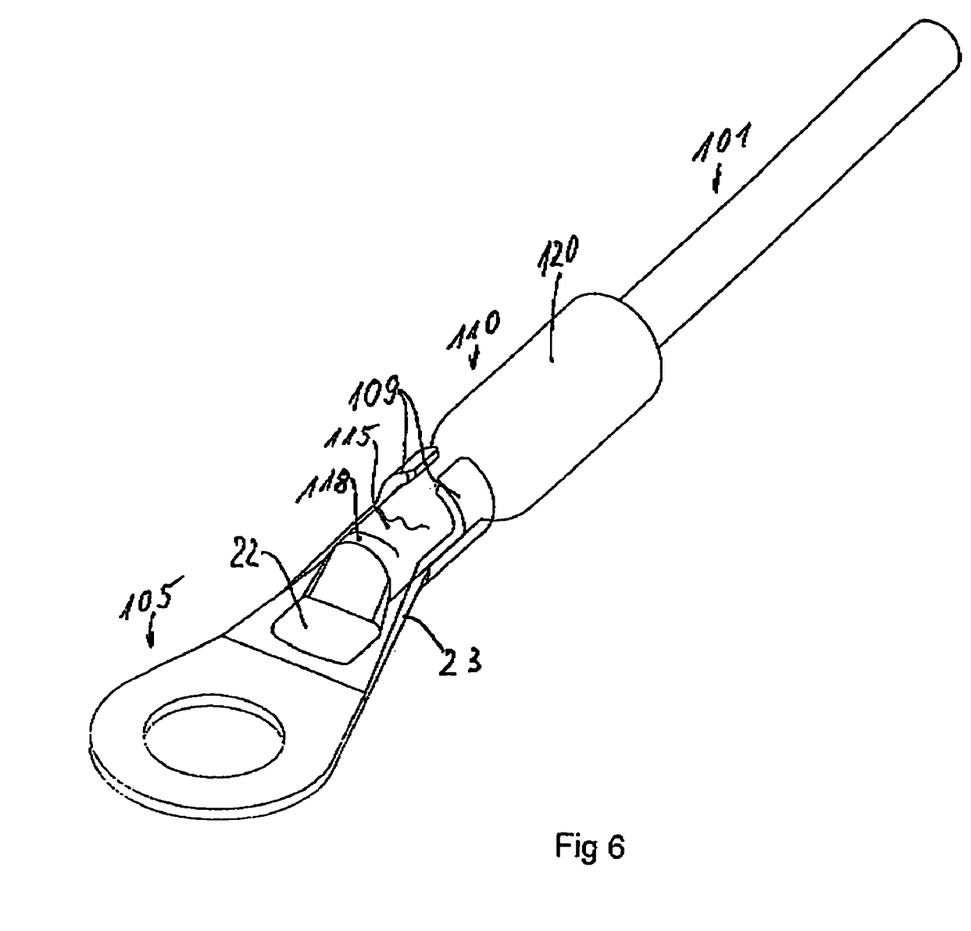

An especially advantageous embodiment is shown in FIGS. 4 to 6 and is described in detail by means of the same. Here, FIG. 4 shows an exploded view of the components comprised in the connection before connecting, while FIGS. 5 and 6 represent the condition after connecting or the final condition of the connection, respectively.

In FIG. 1 the cable end 101 with the exposed conductor portion 102 and the insulation portion 103 is visible. The insulation portion 103 has the outer face 104. Furthermore, the cable end piece 105 is visible, which has a connection end 106 with the bore 107. Thus, the connection end 106 has an eyelet shape. As a whole the cable end piece 105 is made from a flat material, for example a copper sheet, by means of punching and bending. The connection end 106 is followed by the connection end 108, to which the tabs 109 belong. In FIG. 4 the tabs 109 are pre-bent in such a manner, that they form some kind of U-shape.

The sleeve 110 is formed with steps. It has a first end 111 and a second end 112. The first end 111 is closed. It belongs to a first sleeve portion 18, having a first outer diameter, which is smaller than the outer diameter of the second sleeve portion 20 connected thereto and facing away from the first end 111. The second sleeve portion 20 formed also cylindrical is followed towards the second end 112 by an outwards directed collar which is not represented. Furthermore, the sealing grommet 116 is visible, which can be formed like the sealing grommet 16 of the embodiment of FIGS. 1 to 3.

In FIGS. 5 and 6 the connected condition is visible. It is visible, that the first sleeve portion 18 is held between the tabs 109, now deformed and abutting its outer con-tour. Furthermore, on the sleeve 110 towards the first end 111 a flattened portion 22 is formed, which is connected to the connection end 106 of the cable end piece 105 by means of resistance welding. In the present embodiment the closed design and the hermetical seal and closure on the first end 111 is not achieved by the welding connection, but such, that the sleeve 110 already in the manufactured condition is closed at the first end 111. The sleeve 110 is only open at the second end 112. In the area of the first sleeve portion 18 the first bore portion 19 is arranged, which is adapted concerning its diameter to the cross-section of the conductor portion 102. In the connected condition, the conductor portion 102 is arranged in the first bore portion 19. The second sleeve portion 20 has a second bore portion 21, which diameter is dimensioned larger in relation to the first bore portion 19 and in relation to the outer face 104 of the cable end 101, accommodated in the second sleeve portion 20, pro-vides an annular accommodation chamber 114 for the sealing grommet 116. A not represented collar at the second end 112 of the sleeve can facilitate the insertion of the sealing grommet 116 into the second bore portion 21 of the sleeve 110. An electrically conductive connection between the conductor portion 102 and the cable end piece 105 is achieved by means of the sleeve 110, such that a crimping 25 of the first sleeve portion 18 in the area between the tabs 109 and the flattened portion 22 is carried out. Between the connection end 106 or the cable end portion 105, respectively, and the sleeve 110 an advantageous electrically conductive connection is achieved via the material connection because of the welding of the flattened portion 22 to the connector end 106. In FIG. 6 it is visible, that the connection end 106 is cranked towards the connection end 108 in the cranked portion 23.

Different to the embodiment of FIGS. 1 to 3, in the embodiment of FIGS. 4 to 6, a hermetical closure is already achieved at the first end such, that the sleeve 110 is closed at the first end 111. Only the gap between the second sleeve portion 20 and the insulation portion 103 of the cable end 101 has to be purposefully sealed. This can be achieved, as already. described in connection with the embodiment of FIGS. 1 to 3, by a corresponding design and clamping of the sealing grommet 116 between the second sleeve portion 20 and the outer face 104 of the insulation portion 103 of the cable end 101. Different to the embodiment of FIGS. 1 and -3, in the embodiment of FIGS. 4 to 6, the sealing grommet 116 is inserted with its full length into the sleeve 110.

Figure 7:
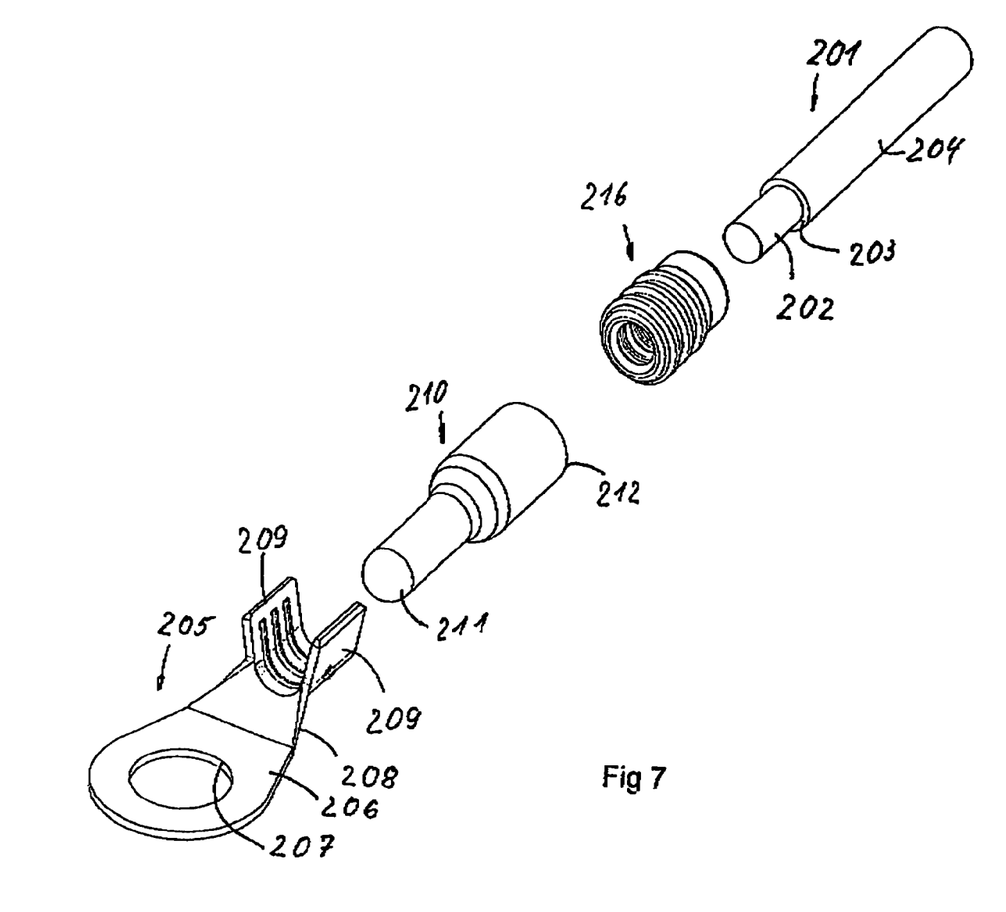
Figure 8:
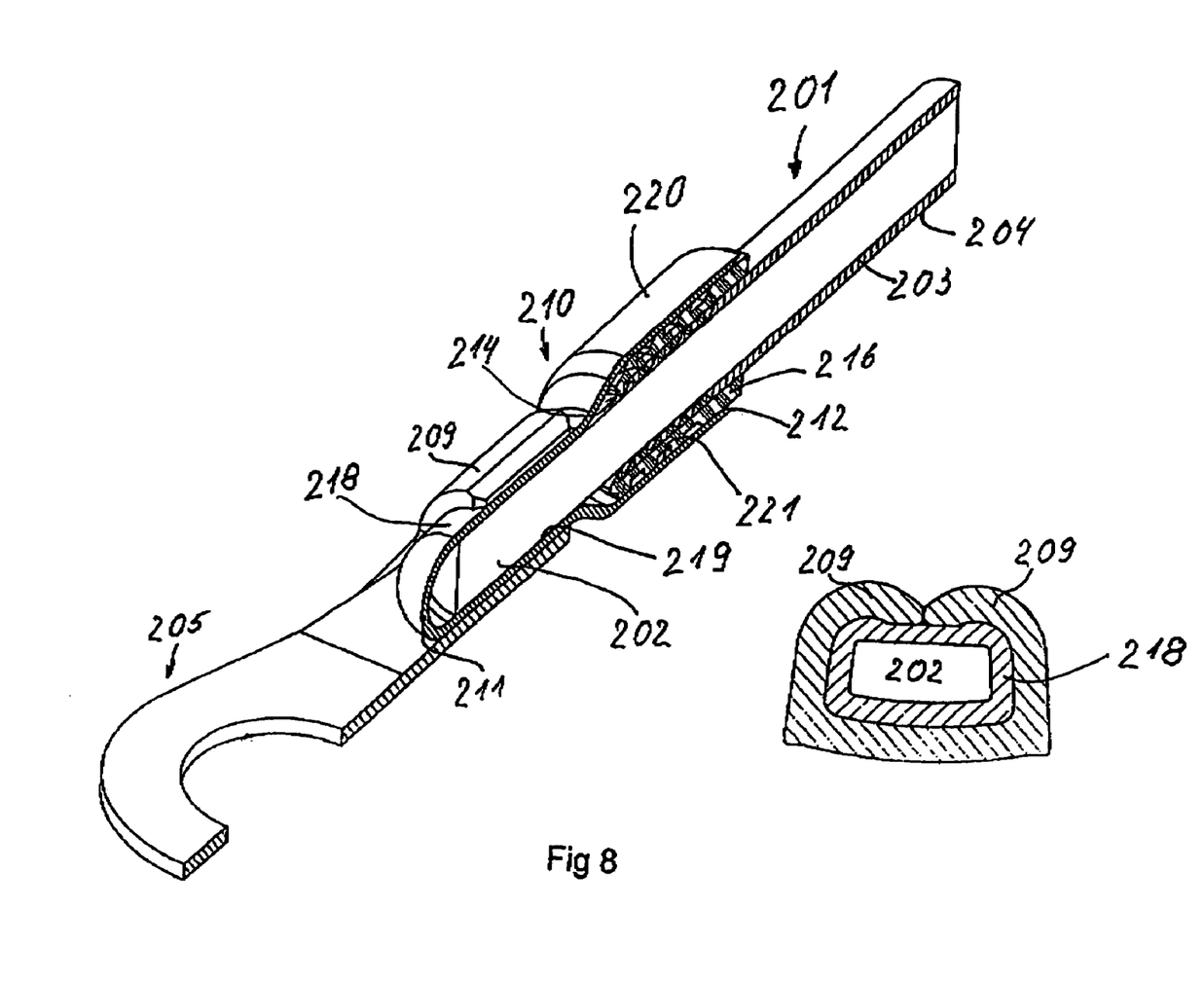
Figure 9:
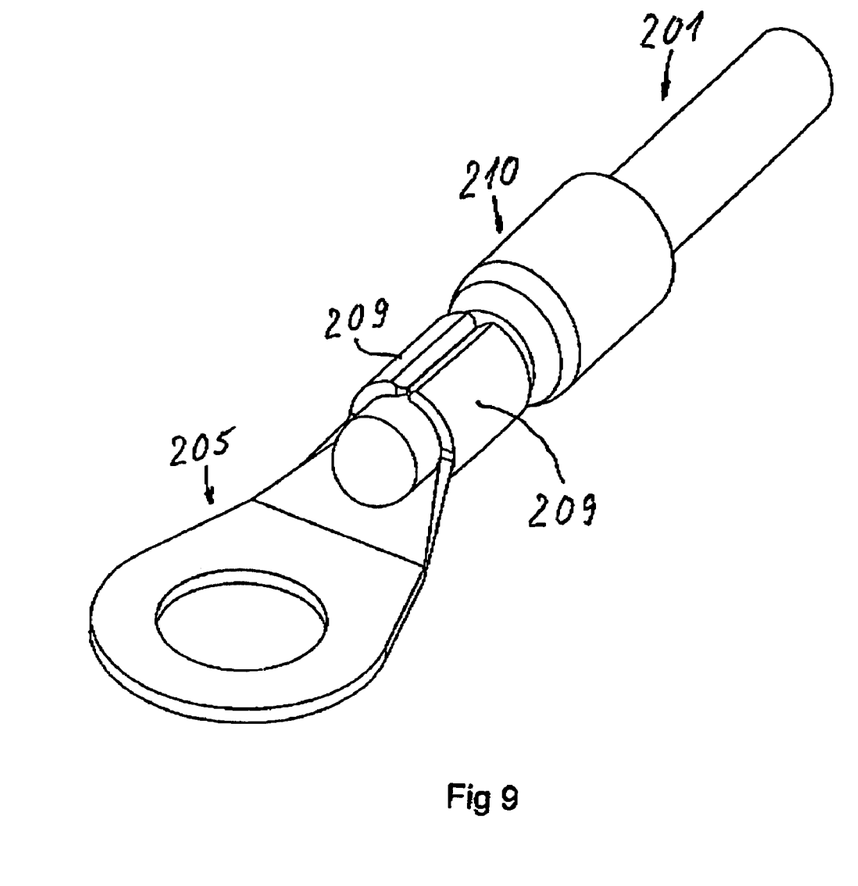

A third advantageous embodiment is shown in FIGS. 7 to 9 and is described in the following by means of the same. While FIG. 7 shows the components belonging to the connection in the still unconnected condition, FIGS. 8 and 9 show the connected condition, i.e. the final condition of the connection.

In FIG. 7 the cable end 201 with the exposed conductor portion 202 at one end and the insulation portion 203 provided in the residual portion with the outer face 204 is visible. This cable end 201 has to be connected to a cable end piece 205, which has a connection end 206, formed as an eyelet, with the bore 207. It comprises further a connection end 208, which is provided with tabs 209, which together from a U-shape. Furthermore, a sleeve 210, formed correspondingly to the second embodiment is provided, which is formed stepped and is closed at its first end 211 and is formed open at its second end 212. Furthermore, the sealing grommet 216 belongs to the connection, which enters into the sleeve 210 and seals towards the sleeve 210 and towards the outer face 204 of the inserted cable end 201. As especially visible from FIG. 8, the sleeve 210 is formed stepped. It has a first sleeve portion 218, adapted concerning the diameter to the conductor portion 202 and which first bore portion 219, which is adapted to the diameter of the conductor portion 202, accommodates the conductor portion 202. The sleeve 210 is formed closed at its first end 211, i.e. at the end of the first sleeve portion 218. A second sleeve portion 220 which is enlarged in diameter in relation to the first sleeve portion 218 is attached to the first sleeve portion 218. Into the same the cable end 201 with its portion provided with the insulation portion 203 projects, wherein the second bore portion 221 in the second sleeve portion 220 is dimensioned that large, that towards the outer face 204 of the insulation portion 203 an accommodation chamber 214 remains. In this accommodation chamber 214, forming an annular chamber, the sealing grommet 216 is arranged such, that it seals towards the second sleeve portion 220, i.e. towards the inner face of the second bore portion 221 and towards the outer face 204 of the insulation portion 203 of the cable end 201.

The electrically conductive and otherwise mechanical connection is achieved to the cable end piece 105 such, that the first sleeve portion 218 accommodating the conductor portion 202, is received between the tabs 209. These are crimped then, as it is especially shown in the cross-sectional representation of FIG. 8. By means of the crimping on the one hand a mechanical and electrically conductive connection between the cable end piece 205 is achieved. On the other hand by means of crimping the tabs 209 of the cable end piece 5, the first sleeve portion 218 of the sleeve 210 is deformed such, that it is crimped to the conductor portion 202. Thus, an electrically conductive connection between the sleeve 210 and the conductor portion 202 is also achieved. The connection between the cable end piece 205, the sleeve 210 and the conductor portion 202 can, hereby, be achieved in one step, i.e. by means of crimping the tabs 209.

Figure 10:
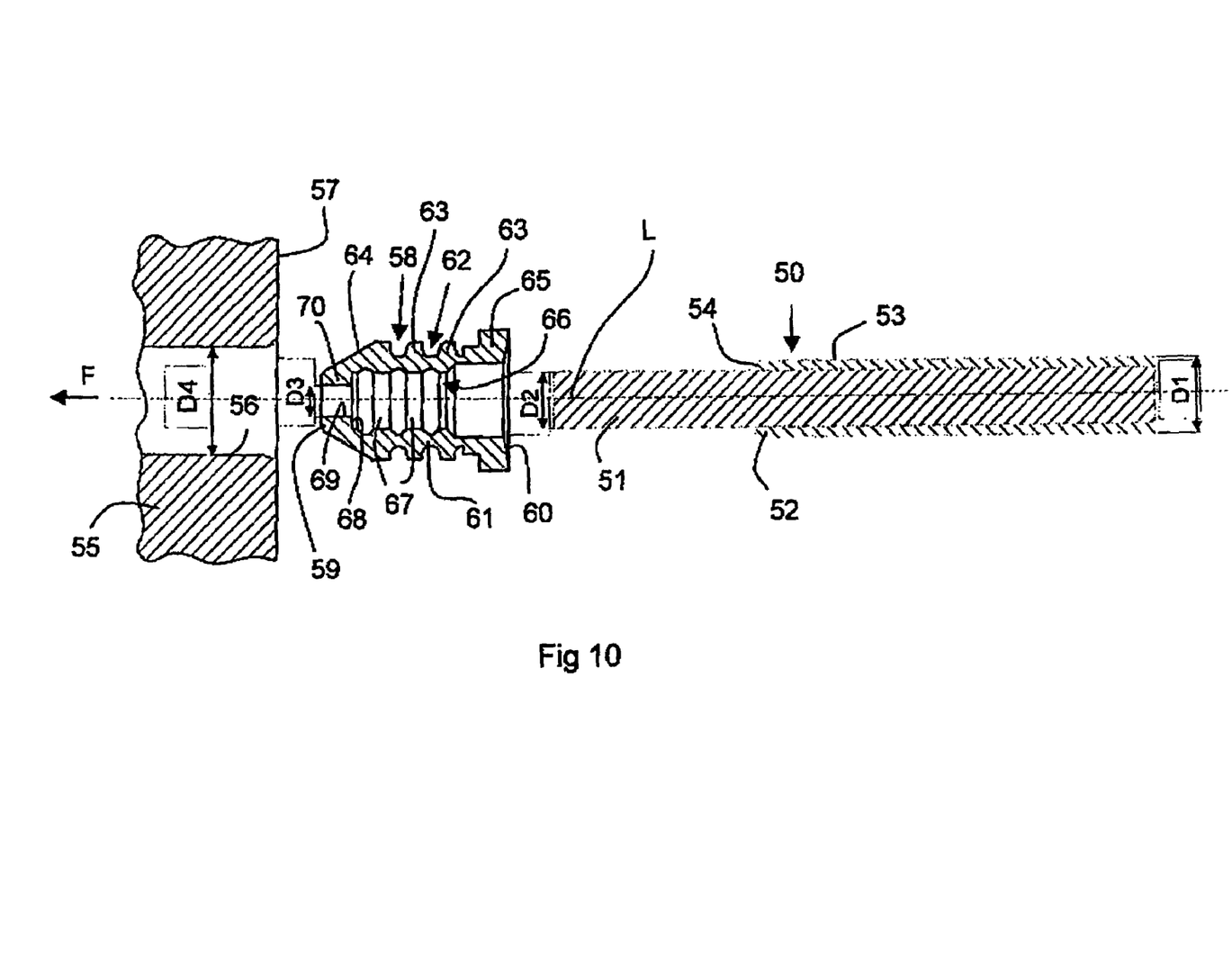

FIG. 10 shows a cable end 50 of a cable, which has the conductor portion 51 with the diameter D2. The conductor portion 51 is exposed, i.e. at this portion the insulation portion 52 is removed. The outer face of the insulation portion 52 is designated with the reference numeral 53 and has the diameter D1. The diameter D1 is larger than the diameter D2, so that at the end of the insulation portion 52 an end face 54 is pro-vided. The cable end 50 should be inserted or passed through an insertion bore 56 of a member 55 in the direction of the arrow F starting from the face 57, respectively. A sealing grommet 58 serves for the sealing between the cable end 50 and the member 55, which is made from a soft elastic material, for example silicone rubber. All above named components are shown in FIG. 10 centered on the axis L and before the assembly.

The sealing grommet 58 represents a first embodiment. It has a first end 59 and a second end 60. It comprises a tubular portion 61, having the outer face 62, on which first annular sealing beads 63 are arranged distributedly along the longitudinal axis L. These first sealing beads 63 project away from the longitudinal axis L and serve for abutting on the wall of the insertion bore 56, to provide a tight (sealed) connection. At the first end 59, the tubular portion 61 of the sealing grommet 58 has a conical insertion face 64, to facilitate the insertion into the insertion bore 56. At the second end 60 an annular collar 65 is provided, which limits the insertion depth of the sealing grommet 58 into the insertion bore 56, such that the annular collar 65 comes into abutment to the face 57 of the member 55. The sealing grommet 58 has a bore 66, extending fully through the tubular portion 61. In the same, approximately in the middle portion of the tubular portion 61, second sealing beads 67 are formed, which are arranged also extending annularly around the longitudinal axis L in the bore 66 and are distanced from each other along the longitudinal axis L. Towards the first end 59, the tubular portion 61 is enlarged towards the inside, i.e. towards the longitudinal axis L, so that a collar 70 is formed, which has a passage 69. The passage 69 has the diameter D3. The diameter D3 of the passage 69 is adapted to the diameter D2 of the conductor portion 51 of the cable end 50. It is, however, only necessary, that D3 is smaller than D1, i.e. is smaller than the outer diameter D1 of the insulation portion 52. The collar 70 forms an abutment 68 in form of an annular face, which serves to come into abutment to the end face 54 of the insulation portion 52, when the cable end 50 is inserted. The bore 66 of the sealing grommet 58 is formed concerning the diameter of its second sealing beads 67 such, that these abut closely the outer face 53 of the insulation portion 52 of the cable end 50. Correspondingly, the free pas-sage, which they form, is smaller than the diameter D1. To provide a tight (sealed) connection towards the insertion bore 56, the outer diameter of the tubular portion 61 of the sealing grommet 58 measured over the first sealing beads 63 is larger than the diameter D4 of the insertion bore 56.

During the assembly, firstly, the sealing grommet 58 is pushed onto the cable end 50 so far, till the abutment 68 of the collar 70 abuts the end face 54 of the insulation portion 52. Then, this unit is pushed into the insertion bore 56. The conductor portion 51 of the cable end 50 projects beyond the first end 59 of the sealing grommet 58, so that it projects beyond the face of the member 55 facing away from the face 57. This end can be connected to a cable end piece, to achieve, for example, an electrically conductive connection to a further equipment. Such an embodiment of the sealing grommet 58 can be provided for the embodiment of a connection represented in FIGS. 1 to 9 and there especially, for the sealing between the cable end and the sleeve.

Figure 11:
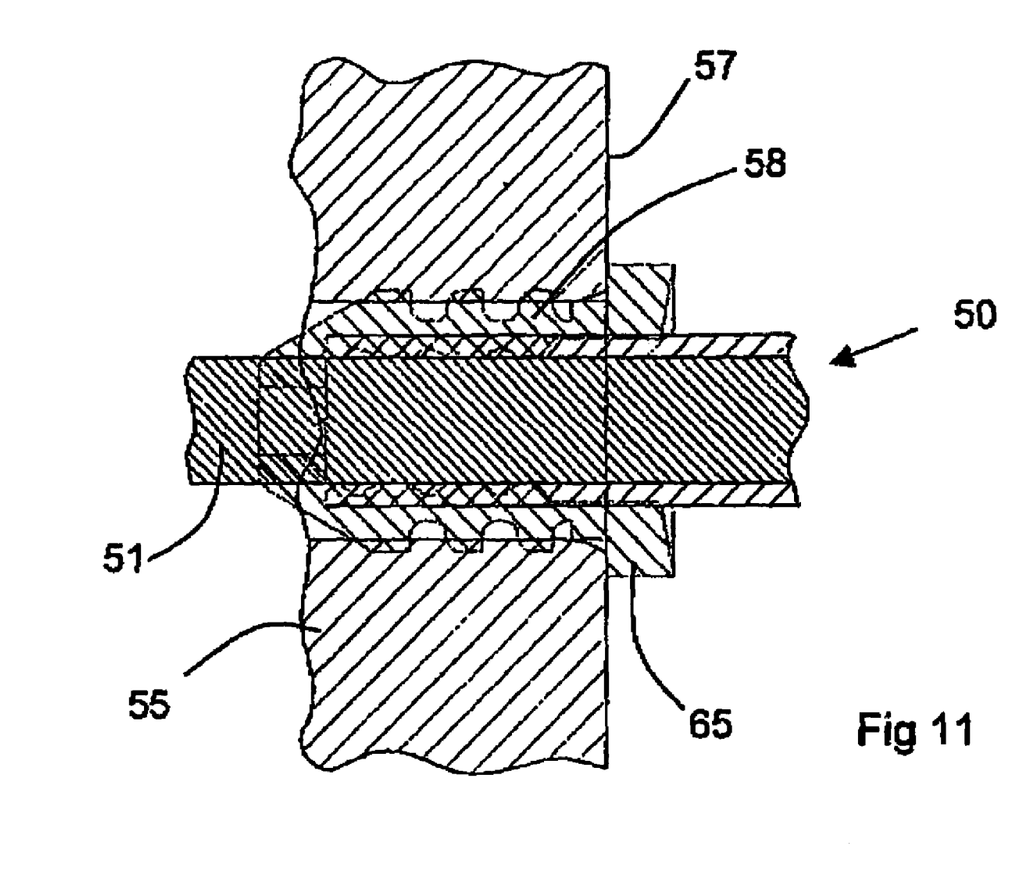

The assembly condition of the components shown in FIG. 10 is visible in FIG. 11, wherein the sealing grommet 58 is shown in the relaxed condition, so that the sealing beads 63, 67 project radially further as in reality in the assembled condition. Thus, it is prevented in the assembled condition of the sealing grommet 58, that the return forces, which are produced during the pressing in of the sealing grommet 58 into the insertion bore 56, cannot become effective such, that the sealing grommet 58 exits, as the sealing grommet 58 is retained on the cable end 50. This cable end 50 is generally mounted by means of components, retained on the conductor portion 51, for example a cable end piece, such, that the cable end 50 cannot move out itself. This is achieved, for example, by means of the connection between the conductor portion with the sleeve or the cable end piece, respectively, as it is described in connection with FIGS. 1 to 9. Of importance is only, that the cable end 50 is retained via components connected to the conductor portion 51 and, therefore, retains also the sealing grommet 58. The sealing grommet 58 cannot, because of the abutment of the abutment 68 on the end face 54, move along the longitudinal axis L against the direction of the arrow F.

Figure 12:
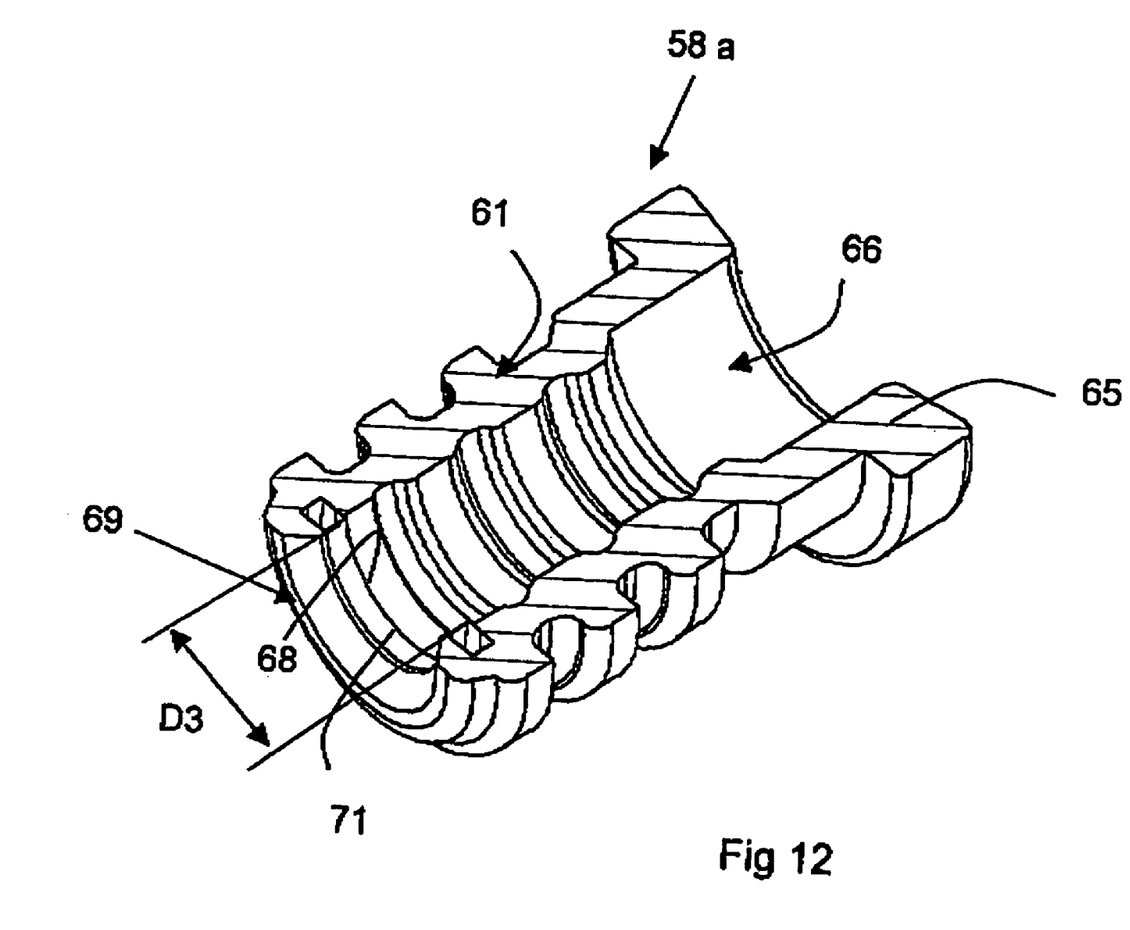

FIG. 12 shows a further embodiment of a sealing grommet 58a, wherein the only difference to the embodiment of FIGS. 10 and 11 is, that the abutment 68 is part of a ring 71, which is made from a material, which is harder than the material, from which the tubular portion 61 of the sealing grommet 58a is made. For example, it is a ring 71 made from a hard plastic like PBT or PA. The ring 71 is, preferably, partly embedded in the tubular portion 61 during the manufacture of the sealing grommet 58a.

From FIG. 12 it is also visible, that the ring 71 is formed such, that a passage 69 is formed, having the diameter D3, which is smaller than the outer diameter D1, measured over the outer face 53 of the insulation portion 52 of the cable end 50, however, dimensioned larger than the outer diameter D2 of the conductor portion 51, so that the same can pass therethrough.

Figure 13:
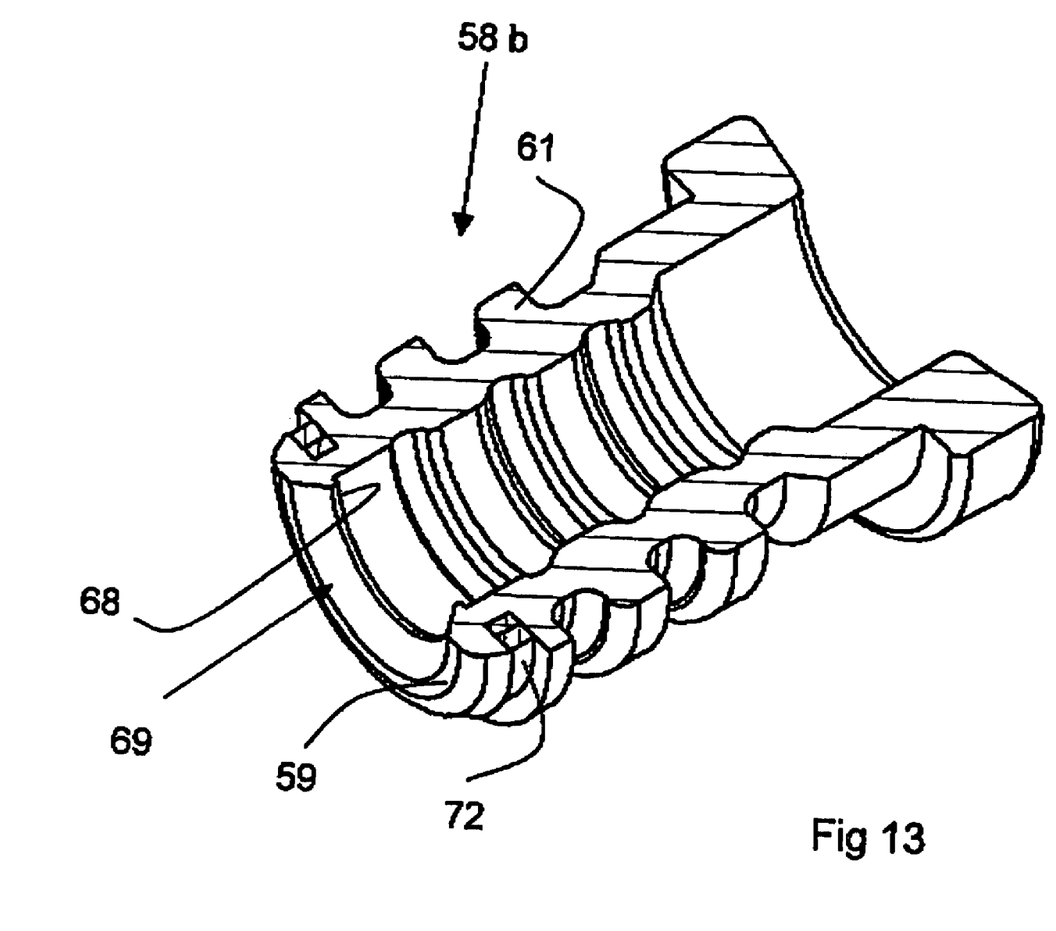

FIG. 13 shows another embodiment of a sealing grommet 58b, wherein towards the first end 59 from the outside, a reinforcement ring 72 is inserted into a circumferentially extending groove of the tubular portion 61, which reduces the free passage 69 towards the first end 59 such, that a partial annular cross-section reduction is produced, which represents the abutment 68. This can be improved such, that in this area a small projection radially directed towards the inside, is formed, so that a defined abutment 68 is produced. The reinforcement ring 71 can, hereby, be made from a hard plastic material or also be punched as a slotted ring from a metal. Possible is also a wire bent to a ring, wherein the reinforcement ring is, respectively, slotted, to enable a widening and insertion into the groove of the tubular portion 61.

What is claimed is:

1. An electrically conductive connection to a cable end, having a conductor portion and an insulation portion with an outer face, comprising:
    a cable end piece made from an electrically conductive metal and including a connection end and a plurality of tabs for connecting;
    a sleeve made from an electrically conductive metal and encloses the cable end along a predetermined length thereof and is connected to the cable end piece, said sleeve having a first end which is proximate the connection end and a second end which is distanced from the connection end, said first end being closed in a sealed manner, said sleeve defining an annular accommodation chamber towards the second end between the sleeve and the outer face of the insulation portion, said sleeve being separate and independent from said cable end piece;
    a sealing grommet arranged at least partially in the accommodation chamber for sealing between the sleeve and the outer face of the insulation portion of the cable end.

2. The connection according to claim 1, wherein the connection end of the cable end piece is formed as one of an eyelet and yoke.

3. The connection according to claim 1, wherein the sleeve is crimped by means of the tabs of the cable end piece to the conductor portion received in the sleeve.

4. The connection according to claim 1, wherein the sleeve comprises a first sleeve portion, having a first bore portion, adapted concerning the diameter to the conductor portion, and a second sleeve portion, which forms by a second bore portion for defining the accommodation chamber.

5. The connection according to claim 4, wherein the first sleeve portion, accommodating the conductor portion, is connected via the tabs to the cable end piece.

6. The connection according to claim 4, wherein the first sleeve portion and the second sleeve portion have different diameters.

7. The connection according to claim 4, wherein the conductor portion is connected to the first sleeve portion by crimping.

8. The connection according to claim 1, wherein the conductor portion is directly crimped by means of the tabs to the cable end piece, the sleeve projects beyond the tabs in the direction towards the connection end and is deformed in a sealing and abutting manner to a transition portion between the tabs and the connection end and the sleeve together with the tabs is crimped at its transition portion covering the tabs.

9. The connection according to claim 8, wherein the portion of the sleeve abutting the transition portion is welded undetachably to the transition portion forming a sealing closure at the first end to the cable end portion.

10. The connection according to claim 1, wherein the sleeve is closed at its first end.

11. The connection according to claim 10, wherein the sleeve includes a flattened portion adjacent the closed first end, which is connected to the cable end piece by a weld.

12. The connection according to claim 1, wherein the sleeve and the cable end piece are made from the same metal.

13. The connection according to claim 12, wherein the metal is a copper material.

* * * * *